(12) United States Patent
Michopoulos et al.

(10) Patent No.: US 8,884,954 B2
(45) Date of Patent: Nov. 11, 2014

(54) ALGORITHM AND A METHOD FOR CHARACTERIZING SURFACES WITH FRACTAL NATURE

(75) Inventors: John G. Michopoulos, Washington, DC (US); Athanasios Iliopoulos, Chevy Chase, MD (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 243 days.

(21) Appl. No.: 13/507,968

(22) Filed: Aug. 10, 2012

(65) Prior Publication Data

US 2013/0050210 A1 Feb. 28, 2013

Related U.S. Application Data

(60) Provisional application No. 61/527,251, filed on Aug. 25, 2011.

(51) Int. Cl.
*G06T 17/00* (2006.01)
*G06T 17/05* (2011.01)

(52) U.S. Cl.
CPC ...................................... *G06T 17/05* (2013.01)
USPC ....................................................... 345/420

(58) Field of Classification Search
CPC ...... H01Q 15/0093; H01Q 1/48; G06T 17/05; G06T 7/0065; G06T 7/406; G06K 9/0014; G06K 9/52; Y10S 977/839; Y10S 977/849
USPC ........................................................ 345/420
See application file for complete search history.

(56) References Cited

U.S. PATENT DOCUMENTS 5,859,919 A 1/1999 Holland et al.
6,333,092 B1 12/2001 Gipple et al.

OTHER PUBLICATIONS

Zhao et al., Inversion problem for the dimension of fractal rough surface, Science in China Ser. F Information Sciences 2005 vol. 48 No. 5, pp. 647-655.*
Vesselenyi et al., Surface Roughness Image Analysis using Quasi-Fractal Characteristics and Fuzzy Clustering Methods, Int. J. of Computers, Communications & Control, vol. III (2008), No. 3, pp. 304-316.*
Wei et al., Fractal Characterstics of End Faces of Carbon-graphite Seal Rings, 2009 International Conference on Measuring Technology and Mechatronics Automation, 2009, pp. 813-816.*

(Continued)

*Primary Examiner* — Kee M Tung
*Assistant Examiner* — Haixia Du
(74) *Attorney, Agent, or Firm* — US Naval Research Laboratory; L. George Legg

(57) ABSTRACT

A computer implemented method for directly determining parameters defining a Weierstrass-Mandelbrot (W-M) analytical representation of a rough surface scalar field with fractal character, embedded in a three dimensional space, utilizing pre-existing measured elevation data of a rough surface in the form of a discrete collection of data describing a scalar field at distinct spatial coordinates, is carried out by applying an inverse algorithm to the elevation data to thereby determine the parameters that define the analytical and continuous W-M representation of the rough surface. The invention provides a comprehensive approach for identifying all parameters of the W-M function including the phases and the density of the frequencies that must greater than 1. This enables the infinite-resolution analytical representation of any surface or density array through the W-M fractal function.

8 Claims, 7 Drawing Sheets
(3 of 7 Drawing Sheet(s) Filed in Color)

(56) References Cited

OTHER PUBLICATIONS

Youngping Chen et al., "Optimal surface fractal dimension for heat and fluid flow in microchannels", American Institue of Physics, pp. 08401-1-3 (Aug. 2010).

Summers et al., "Mathematical modeling and computer aided manufacturing of rough surfaces for experimental study of seafloor scattering", IEEE J. Oceanic Engineering, vol. 32, No. 4, pp. 897-914 (Oct. 2007).

Gautier et al., "Inversion of roughness parameters of self-affine surfaces from backscattered waves", Geophy. J. Int., vol. 160, pp. 797-803 (2005).

B. B. Mandelbrot, "Stochastic Models for the Earth's Relief, the Shape and the Fractal Dimension of the Coastlines, and the Number-Area Rule for Islands," Proc. Nat. Acad. Sci. USA, vol. 71, No. 10, pp. 3825-3828 (Oct. 1975).

M. Ausloos, D. H. Berman, "A Multivariate Weierstrass-Mandelbrot Function," Proceedings of the Royal Society of London. Series A, Mathematical and Physical Sciences, vol. 400, No. 1819, pp. 331-350, (Aug. 1985).

M. V. Berry, Z. V. Lewis, "On the Weierstrass-Mandelbrot Fractal Function," Proc. R. Soc. Lond. A, vol. 370, pp. 459-484, (1980).

* cited by examiner

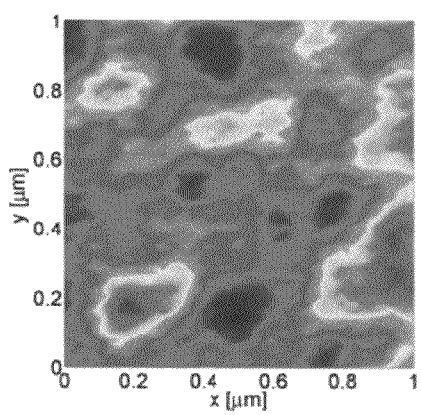 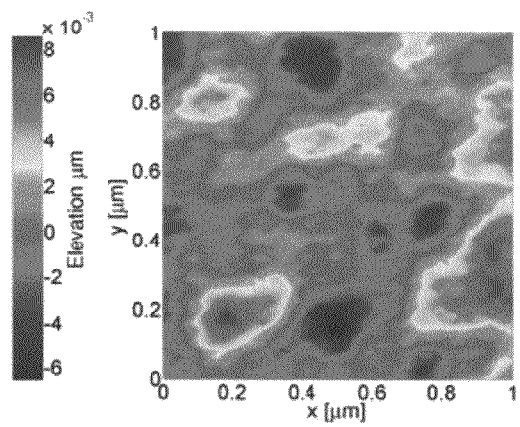
FIGURE 2A
FIGURE 2B
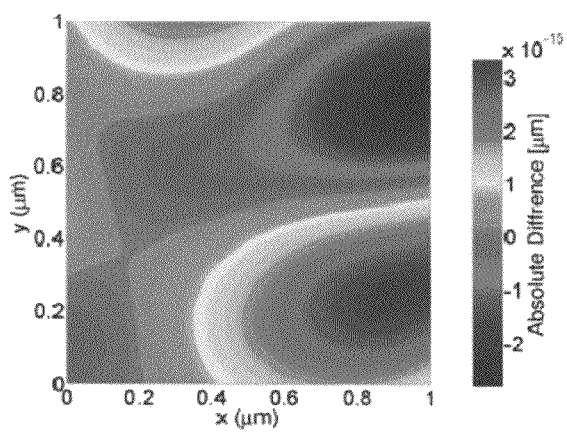
FIGURE 3

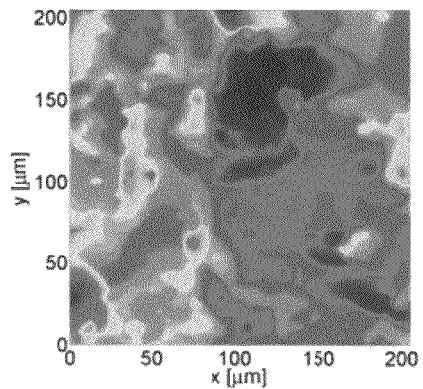 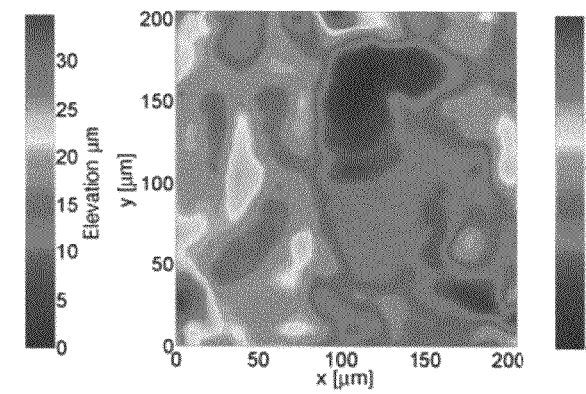
FIGURE 5A  FIGURE 5B
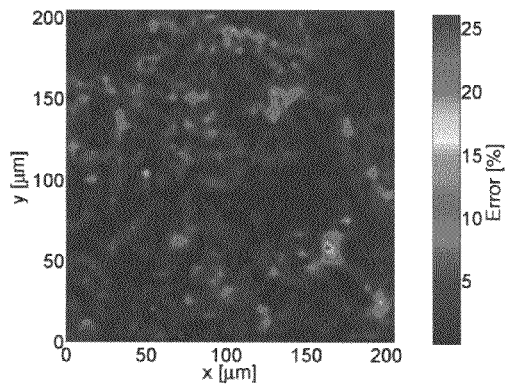
FIGURE 6
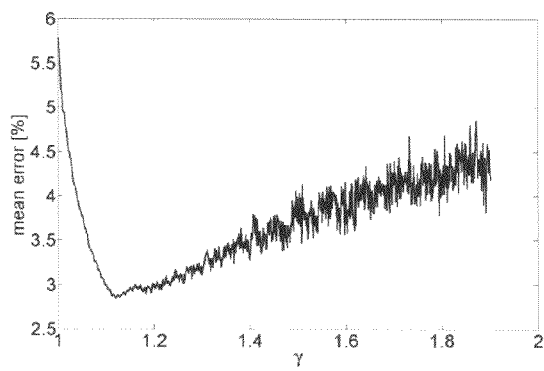
FIGURE 7

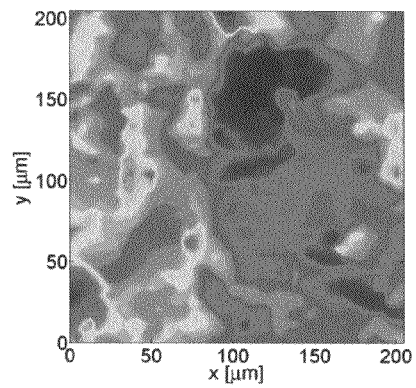
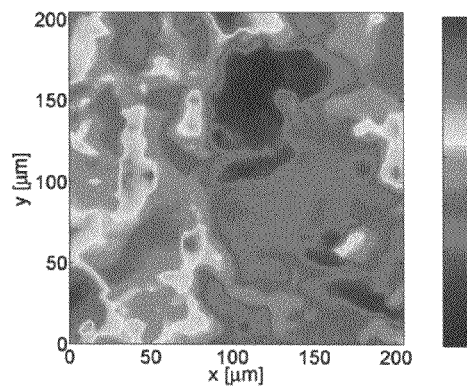
*FIGURE 8A*      *FIGURE 8B*
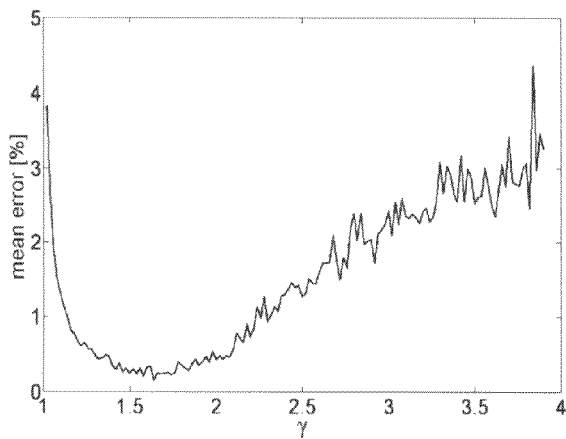
*FIGURE 9*

ALGORITHM AND A METHOD FOR CHARACTERIZING SURFACES WITH FRACTAL NATURE

CROSS-REFERENCE TO RELATED APPLICATIONS

This Application claims the benefit of U.S. Provisional Application 61/527,251 filed on Aug. 25, 2011, incorporated herein by reference.

FIELD OF THE INVENTION

The invention is directed to characterizing a surface with a fractal nature, and more particularly to directly determine parameters defining a Weierstrass-Mandelbrot (W-M) analytical representation of a rough surface scalar field with fractal character.

BACKGROUND OF THE INVENTION

Although fractal modeling of rough surfaces in contact was motivated by inadequacies in the early theory and applications of tribology, there is a plethora of problems that can be benefited from this type of modeling. Usually these are problems that require an estimate of material properties across interfaces between dissimilar materials, although many other areas such as sonic and electromagnetic scattering as well as image processing applications can be benefited by fractal modeling. Within the context of material science, it has already been demonstrated that such a modeling approach is useful for contact of deformable bodies, temperature distribution, friction, thermal contact conductance, and electric resistance.

The Weierstrass-Mandelbrot (W-M) function is employed for surface parametrization and in one approach is a multivariate analytic generalization of its univariate version and has wide applicability in all applications requiring an analytical description of a rough surface. There has been a considerable effort in establishing methodologies of determining just a single parameter describing surface representations and that is the fractal dimension.

The most widely used method for the determination of the fractal dimension—as one of the parameters characterizing the surface under investigation—, regardless of the particular analytical model, is the power spectrum method. However, beyond the obvious weakness that only one of the parameters of the fractal surface can be identified by this method (i.e. the fractal dimension), the method has proven not to be accurate enough and it also enforces assumptions requiring a priori definition of the rest of the parameters that can be very restrictive or not always true.

Surface Modeling

It has been established that a W-M function is s very rich analytical representation that can model surface topographies of fractal nature such as material surfaces at small scales. This seems to be true especially because of the properties of continuity, non-differentiability and self affinity of specific types of fractals, that are also desired properties of surface topographies. The surface power spectra obeys a power-law relationship over a wide range of frequencies, because the surface topographies resemble a random process. Such a surface can be represented by a complex function W as:

$$W(x) = \sum_{n=-\infty}^{\infty} \gamma^{(D-2)n}(1 - e^{i\gamma^n x})e^{i\phi_n} \quad (1)$$

where x is a real variable. A two dimensional profile can be obtained from the real part of Eq. 1:

$$z(x) = \text{Re}[W(x)] = \sum_{n=-\infty}^{\infty} \gamma^{(D-2)n}[\cos\phi_n - \cos(\gamma^n x + \phi_n)]. \quad (2)$$

The relevant parameters here are defined as follows: D is the fractal dimension (1<D<2 for line profiles), $\phi_n$ is a random phase that is used to prevent coincidence of different phases, n is the frequency index and $\gamma$ is a parameter that controls the density of the frequencies and must be greater than 1; $\gamma$ usually takes values in the vicinity of 1.5 because of surface flatness and frequency distribution density considerations. The later though has been recently debated and only the requirement $\gamma>1$ was considered as a valid assumption.

A three-dimensional fractal surface that exhibits randomness is the two-variable W-M function that is given by:

$$z(r, \theta) = \sqrt{\left(\frac{\ln\gamma}{M}\right)} \sum_{m=1}^{M} \sum_{n=-\infty}^{\infty} (k\gamma^n)^{D-3}\{\cos\phi_{mn} - \cos[k\gamma^n r\cos(\theta - \alpha_m) + \phi_{mn}]\} \quad (3)$$

where M is the number of superimposed ridges, D now takes values between 2 and 3, $\alpha_m$ is an arbitrary angle that is used to offset the ridges in the azimuthal direction and is equal to $\pi m/M$ for equally offset ridges. k is the wave number and is given by: $k=2\pi/L$, L is the size of the sample. In practice the upper limit of n is not infinite and is given by:

$$N = n_{max} = \text{int}[\log(L/L_c)/\log\gamma] \quad (4)$$

with $L_c$ being a cut-off wavelength, typically defined either by the highest sampling frequency, or by a physical barrier like the interatomic distance of the surface atoms. Since the lowest frequency is 1/L, the lowest limit of n can be set equal to 0. Finally the cartesian coordinates (x,y) are mapped to polar coordinates (r,θ) according to:

$$r = \sqrt{x^2 + y^2}, \theta = \tan^{-1}\left(\frac{y}{x}\right) \quad (5)$$

If we substitute the previous relationships of $A_m$, $\alpha_m$, r, θ, k and the limits of n, in Eq. 3 we get:

$$z(x, y) = A\left(\frac{L}{2\pi}\right)^{3-D} \sqrt{\frac{\ln\gamma}{M}} \sum_{m=1}^{M} \sum_{n=0}^{N} \gamma^{(D-3)n} \quad (6)$$

-continued $$\{\cos\phi_{mn} \cdot - - \cos\left[\frac{2\pi\gamma^n\sqrt{x^2+y^2}}{L}\cos\left(\tan^{-1}\left(\frac{y}{x}\right)-\frac{\pi m}{M}\right)+\phi_{mn}\right]$$

Parameter A can be substituted by $2\pi(2\pi/G)^{2-D}$, and therefore Eq. 6 becomes:

$$z(x, y) = L\left(\frac{G}{L}\right)^{D-2}\sqrt{\frac{\ln\gamma}{M}}\sum_{m=1}^{M}\sum_{n=0}^{N}\gamma^{(D-3)n} \quad (7)$$

$$\{\cos\phi_{mn} \cdot - - \cos\left[\frac{2\pi\gamma^n\sqrt{x^2+y^2}}{L}\cos\left(\tan^{-1}\left(\frac{y}{x}\right)-\frac{\pi m}{M}\right)+\phi_{mn}\right]$$

The parameter G is independent of the frequency and is referred to as the fractal roughness.

Although the surface representation of Eq. 7 is in a generally convenient form for computations and phenomenological observations, it is still not in a form that can be used to identify the phases $\phi_{mn}$. In order to achieve phase identification for a given set of topographic or elevation data, we need to use an expression that decouples the phases from the other variables in the function. Such a refactored representation exists and in the 2 dimensional case is expressed by the complex function:

$$W(r) = W(r, \theta) \quad (8)$$

$$= \sqrt{\frac{\ln\gamma}{M}}\sum_{m=1}^{M}A_m\sum_{n=-\infty}^{\infty}\left(-e^{ik_0\gamma^n r\cos(\theta-a_m)}\right)e^{i\phi_{mn}}(k_0\gamma^n)^{D-3}$$

Performing the same substitutions with those in Eqs. 3, 6 and 7, the previous relationship takes the refactored form:

$$W(r, \theta) = L\left(\frac{G}{L}\right)^{D-2}\sqrt{\frac{\ln\gamma}{M}}\sum_{m=1}^{M}\sum_{n=0}^{N}\gamma^{(D-3)n}\left(1-e^{i\frac{2\pi}{L}\gamma^n r\cos(\theta-a_m)}\right)e^{i\phi_{mn}} \quad (9)$$

The parameters in this equation have the exact same meaning as the parameters in Eq. 3.

Next, assume that for a given set of parameters, a surface is described by Eq. 9. For another set of the D and G parameters D' and G' we seek to calculate the new phases, so that the new and the original surfaces coincide:

$$W'(r,\theta)=W(r,\theta), \forall r, \theta\in R \quad (10)$$

or:

$$L\left(\frac{G}{L}\right)^{D-2}\sqrt{\frac{\ln\gamma}{M}}\sum_{m=1}^{M} \quad (11)$$

$$\sum_{n=0}^{N}\gamma^{(D-3)n}\left(1-e^{i\frac{2\pi}{L}\gamma^n r\cos(\theta-a_m)}\right)e^{i\phi_{mn}} == L\left(\frac{G'}{L}\right)^{D'-2}\sqrt{\frac{\ln\gamma}{M}}\sum_{m=1}^{M}$$

$$\sum_{n=0}^{N}\gamma^{(D'-3)n}\left(1-e^{i\frac{2\pi}{L}\gamma^n r\cos(\theta-a_m)}\right)e^{i\phi'_{mn}}$$

For Eq. 11 to hold for all r, $\theta\in R$ it must also hold that all the added in parameters of the sums be equal. Since the $$c(r,\theta) = \left(1-e^{i\frac{2\pi}{L}\gamma^n r\cos(\theta-a_m)}\right)$$

expressions on the left and right side of Eq. 11 are equal, it must therefore hold:

$$L\left(\frac{G}{L}\right)^{D-2}\sqrt{\frac{\ln\gamma}{M}}\gamma^{(D-3)n}e^{i\phi_{mn}} = L\left(\frac{G'}{L}\right)^{D'-2}\sqrt{\frac{\ln\gamma}{M}}\gamma^{(D'-3)n}e^{i\phi'_{mn}} \quad (12)$$

Solving Eq. 12 for $\phi'_{mn}$:

$$\phi'_{mn} = 2\pi v - i\ln\left[e^{i\phi_{mn}}\left(\frac{G}{L}\right)^{D-2}\gamma^{n(D-D')}\left(\frac{G'}{L}\right)^{2-D'}\right] \quad (13)$$

with $v\in Z$ an arbitrary number. Clearly, the fact that we can always find a new set of values for the phases, for any combination of the fractal parameters D and G indicates that we can always find a surface, independent of the magnitudes of those two parameters. From a characterization perspective this means that these two parameters can be selected to be known, since the phases can adjust for different choices of D and G. This finding has serious implications on all physics-based models that are based on parameters D and G, because we have demonstrated that alternative values for D and G can be used if an alternative but consistent set of phases is established.

It would therefore be desirable to provide a method for determining all of the critical parameters involved in the full specification of the W-M function.

BRIEF SUMMARY OF THE INVENTION

According to the invention, a computer implemented method for directly determining parameters defining a Weierstrass-Mandelbrot (W-M) analytical representation of a rough surface scalar field with fractal character, embedded in a three dimensional space, utilizing pre-existing measured elevation data of a rough surface in the form of a discrete collection of data describing a scalar field at distinct spatial coordinates, is carried out by applying an inverse algorithm to the elevation data to thereby determine the parameters that define the analytical and continuous W-M representation of the rough surface.

The invention provides an approach that enables the determination of the mechanical, thermal, electrical and fluid properties of the sliding contact between two different conductors of heat and electric current in contact, under simultaneous mechanical loading as it transitions from a static, to low velocity, up to high velocity and as phase transformation occurs. The invention also enables the determination of the initial properties of this evolutionary staging as it relates to the static contact case from simple profilometric data. Overall, the invention determines all of the parameters that control the parametric representation of a surface possessing both a random and fractal character.

The invention provides a comprehensive approach for identifying all parameters of the W-M function including the phases and the density of the frequencies that must greater than 1. This enables the infinite-resolution analytical representation of any surface or density array through the W-M fractal function.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2A-B respectively show pseudo-colored density plots of synthetic surfaces and inversely identified surfaces of a W-M fractal according to the invention;

FIG. 3 shows the pseudo-colored density plots of the absolute difference between reference and identified surfaces according to the invention (note that the order of magnitude is $10^{-15}$);

FIGS. 5A-B respectively show pseudo-colored density plots of Aluminum 6061T6 profilometric data and inversely identified aluminum surface for a fractal with M×N=25×25 according to the invention;

FIG. 6 shows pseudo-colored density plots of the percentage error difference between the surfaces of FIGS. 5A and 5B according to the invention;

FIG. 7 is a graph showing the mean error of inverse identification through Singular Value Decomposition (SVD) vs parameter $\gamma$ for the aluminum surface and M×N=25×25 according to the invention;

FIGS. 8A-B respectively show pseudo-colored density plots of Aluminum 6061T6 profilometric data and inversely identified aluminum surface for a fractal with M×N=50×50 according to the invention;

FIG. 9 is a graph showing the mean error of inverse identification through SVD vs. parameter $\gamma$ for the aluminum surface and M×N=50×50 according to the invention;

DETAILED DESCRIPTION OF THE INVENTION

The Inverse Problem

Figure 1A:
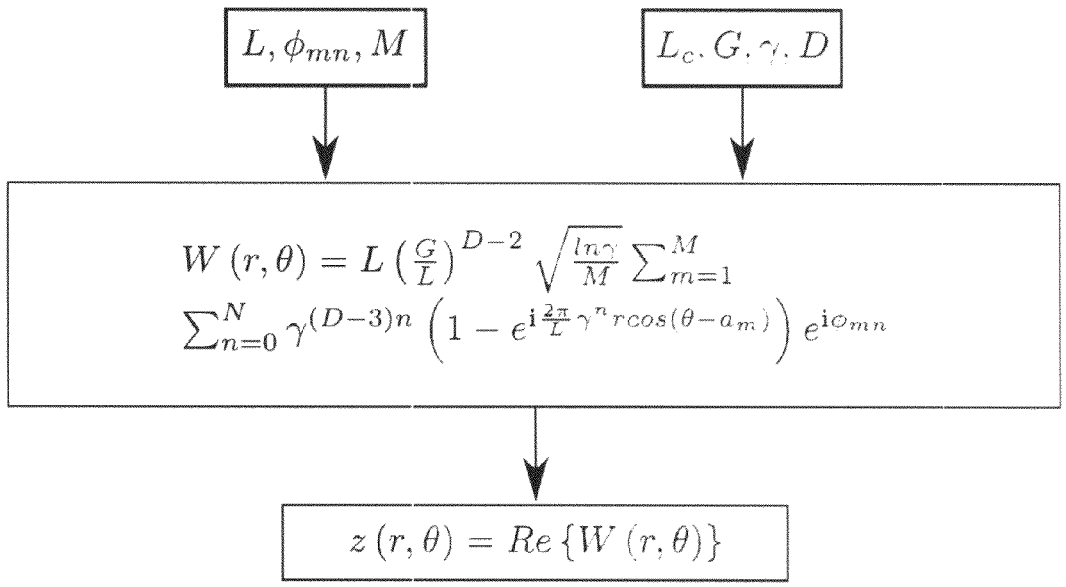
FIG. 1A is a block diagram showing the forward problem perspective and FIG. 1B is a block diagram showing the inverse problem perspective A according to the invention.
Figure 1B:
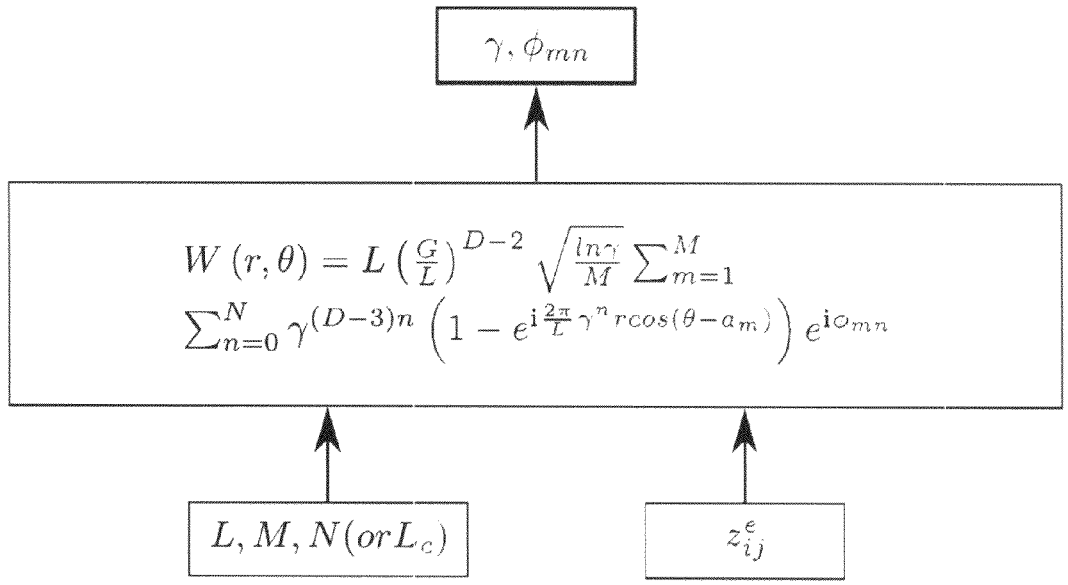

The systemic view of both the forward and the inverse problem is shown in FIGS. 1A-B. In the case of the inverse problem, it is shown that its solution produces the parameters of the fractal surface function provided that the topography or profilometric values of the surface $z(x,y)$ have been experimentally determined and therefore are known.

More specifically, given an array of elevation or height measurements $z_{ij}^e$, i, j=1 ... K over a square region of size L×L we aim at identifying the parameters $\gamma$ and $\phi_{mn}$ of a surface $z(x,y)$ that best fits those measurements. In previous studies the identification of those parameters was done by defining a global optimization problem and numerically identifying those parameters via a Monte-Carlo optimizer. However, it is obvious that if the purpose is to also identify the phases, the previous approach is computationally unacceptable because of the dimensionality of the inverse problem that makes it computationally inefficient to the point of intolerability.

In the following, the surface represented by the fractal is reformulated, so that it takes a form appropriate for the inverse identification of the phases.

The inner sum in Eq. 9 can be substituted by the product:

$$\sum_{n=0}^{N} \gamma^{(D-3)n}\left(1 - e^{i\frac{2\pi}{L}\gamma^n r\cos(\theta-a_m)}\right)e^{i\phi_{mn}} = c_m(r,\theta)^T f_m \quad (14)$$

where $c_m(r,\theta)$ and $f_m$ are vectors in $R^{(N+1)}$ given by:

$$c_m(r,\theta) = \{c_{m0}, c_{m1}, \ldots, c_{mN}\}^T = \quad (15)$$

$$\left\{\gamma^{(D-3)0}\left(1 - e^{i\frac{2\pi}{L}\gamma^0 r\cos(\theta-a_m)}\right), \gamma^{(D-3)1}\left(1 - e^{i\frac{2\pi}{L}\gamma^1 r\cos(\theta-a_m)}\right), \ldots\right.$$

$$\left.\gamma^{(D-3)N}\left(1 - e^{i\frac{2\pi}{L}\gamma^1 r\cos(\theta-a_m)}\right)\right\}^T$$

and:

$$f_m = \{e^{i\phi_{m0}}, e^{i\phi_{m2}}, \ldots, e^{i\phi_{mN}}\}^T \quad (16)$$

By setting:

$$^*Q = L\left(\frac{G}{L}\right)^{D-2}\sqrt{\frac{\ln\gamma}{M}} \quad (17)$$

Eq. 9 can be written as:

$$W(r,\theta) = {^*Q}\sum_{m=1}^{M} c_m^T f_m \quad (18)$$

By coalescing the vectors $c_m$ and $f_m$ into larger vectors in $R^{M(N+1)}$ such as:

$$c(r,\theta) = \{c_1^T, c_2^T, \ldots, c_M^T\}^T \quad (19)$$

and $$f = \{f_1^T, f_2^T, \ldots, f_M^T\}^T \quad (20)$$

Eq. 18 can be written as:

$$W(r,\theta) = {^*Q}c(r,\theta)^T f \quad (21)$$

For the needs of the inverse problem characterization we assume that a number of measurements at points $r_j^e = \{r_j, \theta_j\}^T$ exist for a surface represented as $z^e(r_j^e) = z^e(r_j, \theta_j)$, j=1 ... K, K≥M(N+1). We seek to identify a surface that is described by Eq. 21 and approximates the experimental points $z^e(r_j, \theta_j)$. To solve this problem we first form the following linear system:

$$\begin{bmatrix} W(r_1, \theta_1) \\ W(r_2, \theta_2) \\ \vdots \\ W(r_K, \theta_K) \end{bmatrix} = \begin{bmatrix} z^e(r_1, \theta_1) \\ z^e(r_2, \theta_2) \\ \vdots \\ z^e(r_K, \theta_K) \end{bmatrix} \quad (22)$$

or:

$$*Q \begin{bmatrix} c(r_1, \theta_1)^T \\ c(r_2, \theta_2)^T \\ \ldots \\ c(r_K, \theta_K)^T \end{bmatrix} \begin{bmatrix} f_1 \\ f_2 \\ \ldots \\ f_M \end{bmatrix} = \begin{bmatrix} z^e(r_1, \theta_1) \\ z^e(r_2, \theta_2) \\ \vdots \\ z^e(r_K, \theta_K) \end{bmatrix} \quad (23)$$

If the vectors in Eq. 22 are expanded, the system can be written as:

$$Cp = z \quad (24)$$

with:

$$C = *Q \begin{bmatrix} c_{11}(r_1, \theta_1), c_{12}(r_1, \theta_1), \ldots, c_{21}(r_1, \theta_1), \ldots, c_{MN}(r_1, \theta_1) \\ c_{11}(r_2, \theta_2), c_{12}(r_2, \theta_2), \ldots, c_{21}(r_2, \theta_2), \ldots, c_{MN}(r_2, \theta_2) \\ \vdots \\ c_{11}(r_K, \theta_K), c_{12}(r_K, \theta_K), \ldots, c_{21}(r_K, \theta_K), \ldots, c_{MN}(r_K, \theta_K) \end{bmatrix}$$

$$p = [\phi_{11}, \phi_{12}, \ldots, \phi_{1N}, \phi_{21}, \ldots, \phi_{MN}]^T$$

and $$z = \begin{bmatrix} z^e(r_1, \theta_1) \\ z^e(r_2, \theta_2) \\ \vdots \\ z^e(r_K, \theta_K) \end{bmatrix}$$

The system of Eq. 23 is an overdetermined system of $M(N+1)$ equations. Since the right hand side vector z contains experimental measurements, it also contains noise; the system cannot, in general, have an exact solution. Nevertheless, we can seek a p, such as ∥Cp−z∥ is minimized, where ∥○∥ is the vector norm. Such a p is known as the least squares solution to the over-determined system. It should be noted that the left hand side expression of Eq. 22 yields results in the complex domain, but as long as a minimal solution is achieved for real numbers on the right hand side, the imaginary parts will be close to 0. A solution can be given by the following equation:

$$p = Vy \quad (25)$$

where V is calculated by the Singular Value Decomposition (SVD) of C as:

$$UDV^T = C \quad (26)$$

where y is a vector defined as $y_i = b_i'/d_i$, $b = \{b_i\}$ is a vector given by:

$$b = U^T p \quad (27)$$

and $d_i$ is the ith entry of the diagonal of D.

The solution of the inverse problem as described by the overdetermined system of Eq. 22 gives the phases $\phi_{mn}$ given known values of the other parameters. In a general surface the only other parameter that is unknown is γ. It is evident from Eq. (13) that parameters G and D don't need to be considered as unknowns to be determined in this optimization. This is because for any combination of the phases it is always possible to find new values for $\phi_{mn}$, that result in generating the same surface as was demonstrated earlier.

Furthermore, $L_c$ can be chosen arbitrarily and with the intend to increase the number of phases participating in the reconstruction of the surface, we can always arbitrarily choose a number for the N or vice versa. Of course the higher the number of M and N the better the surface will be approximated. We have found that practically an upper limit of those parameters that gives satisfactory results is that of the size of the approximated dataset.

Numerical Experiments

In order to assess the quality of the surface characterization results of the numerical examples that follow, we define the following error function:

$$\text{error} = \frac{\sum_{i=1}^{P} \left| \frac{z_i^e - z_i^d}{\max(z_i)^d - \min(z_i^d)} \right|}{P} \quad (28)$$

where $z_i^e$ is the elevation of the experimentally measured (or reference) points, P is the number of those points. In the following examples P is set as P=K×K=50×50=2500 points. $z_i^d$ is the elevation of the inversely identified surface and is equal to the real part of the truncated W-M function 9 ($z_i^d = \text{Re}\{W(r,\theta)\}$).

TABLE 1

PARAMETERS OF THE REFERENCE MODEL

| Parameter | Value | Units |
|---|---|---|
| L | 1 | μm |
| $L_c$ | 0.015 | μm |
| G | $1 \times 10^{-6}$ | μm |
| γ | 1.5 | |
| D | 2.3 | |
| M | 10 | |

To study the feasibility of the proposed approach, a few numerical experiments were designed. The first experiment was based on synthetic data and is aimed at inversely identifying only the phases of a surface constructed by the fractal itself. The original surface is shown in FIG. 2A and was constructed using Eq. 7 with random phases and the parameters as shown in Table 1. The inversely identified surface using the phases resulting from Eq. 25 is presented in FIG. 2B. The absolute difference between those two surfaces is shown in FIG. 3. It should be noted that this difference is very small compared to the magnitude of the surface and any discrepancies should be considered as the numerical error of the SVD algorithm. Another interesting remark that is not obvious here is the fact that the real part of the identified phases from the inversion where differing from the ones of the forward problem by 2 πk with k=−1, 0, 1 showing no deterministically defined selection for one of these three values.

Figure 4:
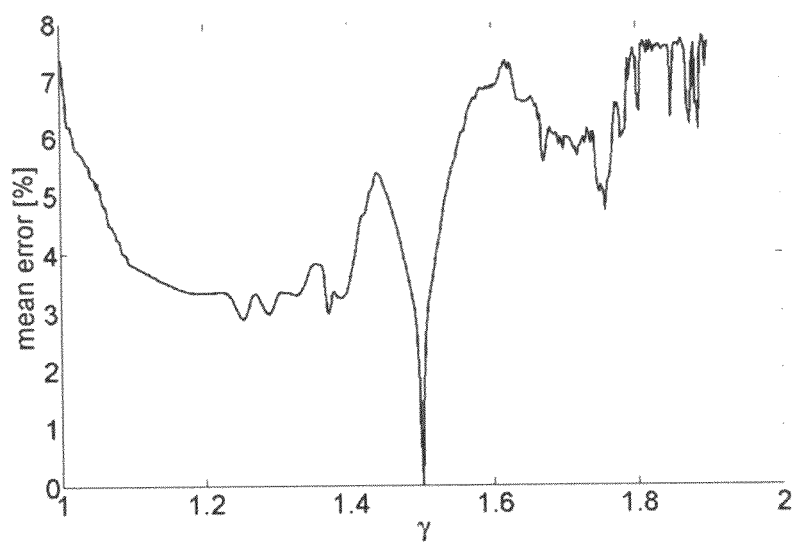
FIG. 4 is a graph of the mean error of inverse identification through vs parameter $\gamma$ according to the invention.
Figure 10A:
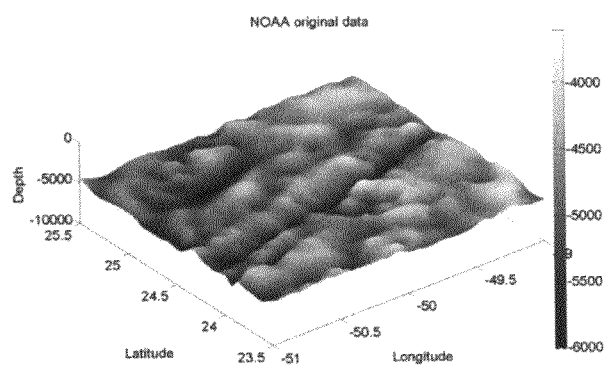
FIGS. 10A-B respectively show Bathymetry data: Kane Fracture Zone and Analytical Reconstruction of Kane Fracture Zone Bathymetry according to the invention.
Figure 10B:
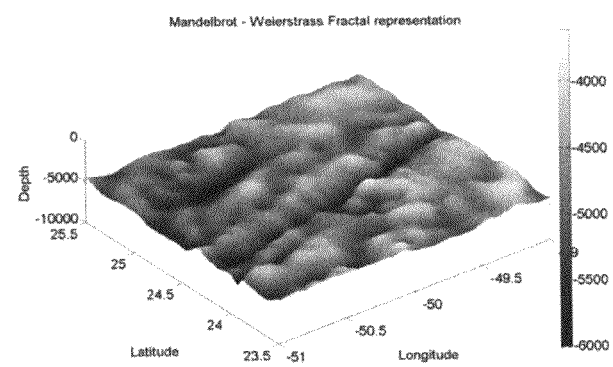
Figure 11A:
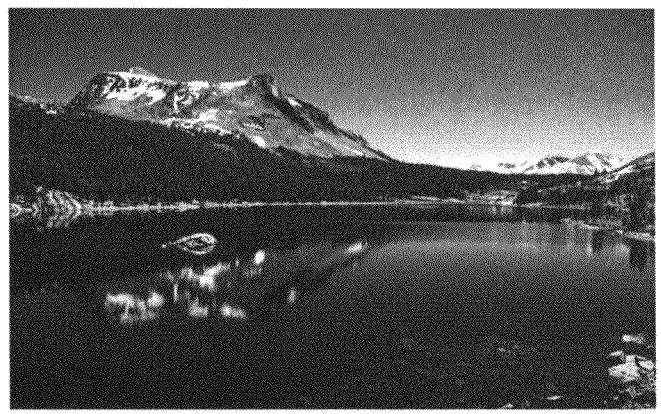
FIGS. 11A-B respectively show Image data: Glacier Canyon and Analytical Reconstruction of Glacier Canyon Image according to the invention.
Figure 11B:
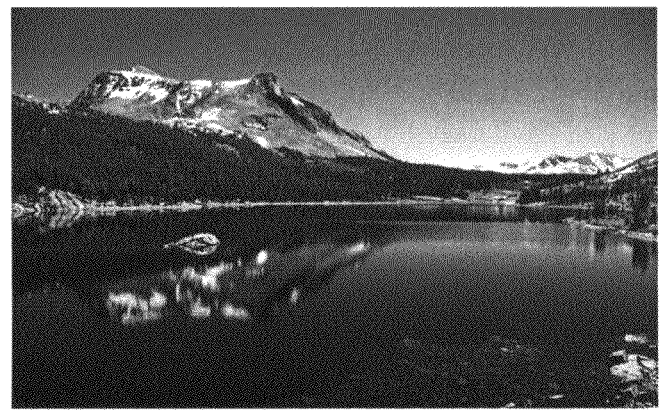

The second synthetic experiment involved the identification of both the phases and the γ parameter. An exhaustive search approach was adopted in this case, as the sensitivity of the SVD inversion relative to the value of γ is also of interest. For a range of the possible values for parameter γ the inversion of the phases was executed and the value of the error function (Eq. 28) was calculated. The error for various values of γ is presented on FIG. 4. The smallest value for the error is at γ=1.5, which is the one used originally for the generation of the surface (Table 1).

Although the previous analysis demonstrates the consistency of the proposed approach, it is much more useful when applied to actual surfaces. For this reason, two numerical tests are performed based on profilometric data of an aluminum 6061-T6 alloy surface are presented here. The experimentally measured surface for a domain size of 50×50 measurements of a domain that is 200×200 μm² is presented in FIG. 5A.

In FIG. 5B the inversely identified surface are presented for the values of γ returning the lowest error. The absolute difference between the original surface and the approximated surfaces are presented in FIG. 6, while the value of error for the various values of γ is in FIG. 7. As is shown in FIG. 6 very few areas of the image exceed 10% error. This is an indication suggesting exploration of the possibility to use the W-M function as compression algorithm, which indeed we have already undertaken and present results in the future. On the other hand, FIG. 9 demonstrates that when the same number of phases is used for the characterization as the ones corresponding to the dimensions of the experimental data array, the error stays mostly below 0.6% and only a few points reach values in the neighborhood of 1.4%. We consider this to be a very successful characterization outcome.

Applications of the invention include quantum structure description, material microstructure, materials surface descriptions, materials surface characterization, image intensity or color space value representation and image compression, bathymetry representation, geo-spatial elevation representation, acoustic surface representation, electromagnetic surface representation, and cosmological and astrophysical data representation.

FIGS. 8-11 show the efficacy of the invention as applied to three exemplary applications of the algorithm. FIGS. 8A-B respectively show Profilometry: Aluminum 6061T6 and Analytical Reconstruction of Aluminum 6061T6 profilometry for a domain size of 50×50; FIGS. 10A-B respectively show Bathymetry data: Kane Fracture Zone and Analytical Reconstruction of Kane Fracture Zone Bathymetry; and FIGS. 11A-B respectively show Image data: Glacier Canyon and Analytical Reconstruction of Glacier Canyon Image. It is evident from these examples that the invention significantly improves the resolution of the images and differentiation between features in the images.

It should be noted that the present invention can be accomplished by executing one or more sequences of one or more computer-readable instructions read into a memory of one or more computers from volatile or non-volatile computer-readable media capable of storing and/or transferring computer programs or computer-readable instructions for execution by one or more computers. Volatile computer readable media that can be used can include a compact disk, hard disk, floppy disk, tape, magneto-optical disk, PROM (EPROM, EEPROM, flash EPROM), DRAM, SRAM, SDRAM, or any other magnetic medium; punch card, paper tape, or any other physical medium. Non-volatile media can include a memory such as a dynamic memory in a computer. In addition, computer readable media that can be used to store and/or transmit instructions for carrying out methods described herein can include non-physical media such as an electromagnetic carrier wave, acoustic wave, or light wave such as those generated during radio wave and infrared data communications.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims. For example, regarding the array of elevation data described above, it would be readily apparent to one skilled in the art that it could also be applicable for non-square domains (e.g. rectangular, con-convex polygonal). Likewise, the data is not limited to just rectangular grids, but also grids of arbitrary nature.

What is claimed as new and desired to be protected by Letters Patent of the United States is:

1. A computer software product for directly determining parameters defining a Weierstrass-Mandelbrot (W-M) analytical representation of a rough surface scalar field with fractal character, embedded in a three dimensional space, utilizing pre-existing measured elevation data of a rough surface in the form of a discrete collection of data describing a scalar field at distinct spatial coordinates, the product comprising a non-transitory physical computer-readable medium including stored instructions that, when executed by a computer, cause the computer to apply an inverse algorithm to the elevation data to thereby determine the parameters that define the analytical and continuous W-M representation of the rough surface, and wherein the surface has an array of elevation or height measurements $z_{ij}^e$, i, j=1 ... K over a square region of size L×L and the parameters are γ and $\phi_{mn}$ of the surface z(x, y) and the surface is represented by the complex Weierstrass-Mandelbrot (W-M) function W as:

$$W(x) = \sum_{n=-\infty}^{\infty} \gamma^{(D-2)n}(1 - e^{i\gamma^n x})e^{i\phi_n} \quad (1)$$

where x is a real variable, and where a two dimensional profile obtained from the real part of Eq. 1 is:

$$z(x) = \text{Re}[W(x)] = \sum_{n=-\infty}^{\infty} \gamma^{(D-2)n}[\cos\phi_n - \cos(\gamma^n x + \phi_n)]. \quad (2)$$

and where D is the fractal dimension (1<D<2 for line profiles), $\phi_n$, is a random phase that is used to prevent coincidence of different phases, n is the frequency index and γ is a parameter that controls the density of the frequencies, and wherein the instructions include applying a Singular Value Decomposition (SVD) algorithm to a refactoring of Eq. (1), thereby determining said parameters of the Weierstrass-Mandelbrot (W-M) function describing the surface originally given in terms of measured elevation data.

2. The computer software product of claim 1, wherein the instructions including the application of the SVD algorithm comprise:

representing a least squares solution p:

$$p=Vy \quad (3)$$

where a system can be written as:

$$Cp=z$$

and calculating V by the Singular Value Decomposition (SVD) of C as:

$$UDV^T=C \quad (4)$$

where y is a vector defined as $y_i=b_i'/d_i$, $b=\{b_i\}$ is a vector given by:

$$b=U^Tp \quad (5)$$

and $d_i$ is the ith entry of the diagonal of D.

3. The computer software product of claim 1, wherein the data is profilometry data for materials.

4. The computer software product of claim 1, wherein the data is topography data for planetary terrestrial areas.

5. The computer software product of claim 1, wherein the data is bathymetry data for ocean bottom areas.

6. The computer software product of claim 1, wherein the data is radar topography data for planetary surface descriptions.

7. The computer software product of claim 1, wherein the data is image intensity or color space encoding data.

8. The computer software product of claim 1, wherein the data is topography of acoustic or electromagnetic scatterer surfaces.

* * * * *